United States Patent
Fan et al.

(10) Patent No.: US 10,708,829 B2
(45) Date of Patent: Jul. 7, 2020

(54) METHOD AND DEVICE FOR RANDOM ACCESS CONFIGURATION

(71) Applicant: Telefonaktiebolaget LM Ericsson (publ), Stockholm (SE)

(72) Inventors: Rui Fan, Beijing (CN); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 11 days.

(21) Appl. No.: 16/312,102

(22) PCT Filed: Jun. 5, 2018

(86) PCT No.: PCT/CN2018/089911
§ 371 (c)(1),
(2) Date: Dec. 20, 2018

(87) PCT Pub. No.: WO2018/228237
PCT Pub. Date: Dec. 20, 2018

(65) Prior Publication Data
US 2019/0230562 A1 Jul. 25, 2019

(30) Foreign Application Priority Data
Jun. 16, 2017 (WO) ................ PCT/CN2017/088647

(51) Int. Cl.
*H04L 12/28* (2006.01)
*H04W 36/00* (2009.01)
(Continued)

(52) U.S. Cl.
CPC ....... *H04W 36/0055* (2013.01); *H04W 24/08* (2013.01); *H04W 36/0077* (2013.01); *H04W 74/008* (2013.01); *H04W 74/0833* (2013.01)

(58) Field of Classification Search
CPC ...................................................... H04L 12/28
(Continued)

(56) References Cited

U.S. PATENT DOCUMENTS

2010/0255847 A1 10/2010 Lee et al.
2014/0308956 A1 10/2014 Zhang et al.
(Continued)

FOREIGN PATENT DOCUMENTS

CN 103167574 A 6/2013
CN 104812082 A 7/2015

OTHER PUBLICATIONS

International Search Report and Written Opinion dated Aug. 30, 2018 issued in International Application No. PCT/CN2018/089911. (9 pages).

*Primary Examiner* — Dang T Ton
(74) *Attorney, Agent, or Firm* — Rothwell, Figg, Ernst & Manbeck, P.C.

(57) ABSTRACT

Embodiments of the disclosure generally relate to configuration of a random access preamble transmission. In response to receiving a handover request for handing over a terminal device from a source cell managed by a further network device to a target cell managed by the network device, a network device determines a configuration for a random access preamble transmission. The configuration indicates the number of times of transmission of the random access preamble from the terminal device. Afterwards, the network device transmits the configuration for the random access preamble transmission to the further network device.

19 Claims, 4 Drawing Sheets

(51) Int. Cl.
*H04W 74/00* (2009.01)
*H04W 24/08* (2009.01)
*H04W 74/08* (2009.01)

(58) Field of Classification Search
USPC ........................................................ 370/329
See application file for complete search history.

(56) References Cited

U.S. PATENT DOCUMENTS

2016/0037550 A1* 2/2016 Barabell ........... H04W 72/1263
455/450
2019/0364492 A1* 11/2019 Azizi .................... H04W 24/08

\* cited by examiner

METHOD AND DEVICE FOR RANDOM ACCESS CONFIGURATION

CROSS REFERENCE TO RELATED APPLICATION(S)

This application is a 35 U.S.C. § 371 National Stage of International Patent Application No. PCT/CN2018/089911, filed Jun. 5, 2018, designating the United States and claiming priority to International application no. PCT/CN2017/088647, filed on Jun. 16, 2017. The above identified applications are incorporated by reference.

TECHNICAL FIELD

Embodiments of the present disclosure generally relate to the field of communications, and more particularly, to a method and device for random access configuration.

BACKGROUND

Conventional, in a Long Term Evolution (LTE) network, during handover (HO), a terminal device, for example, user equipment (UE) may perform random access to a target cell managed by a network device (for example, an eNB) to gain synchronization with the target cell. More specifically, the terminal device may initiate the random access channel (RACH) process and transmit a physical random access channel (PRACH) preamble for initial network access. The terminal device may also initiate the RACH and transmit a PRACH preamble signature when the UE is not uplink synchronized but need to send new uplink data or control information. In response to a successful PRACH preamble attempt, the network device may transmit a random access response (RAR) carrying an initial uplink bandwidth assignment to the terminal device.

However, a problem of the conventional solution is that sending one random access preamble during HO may not always work. For example, during beam sweeping, if the network device receives signals via a beam different from the beam used by the terminal device for transmitting the random access preamble, it is highly possible that the network device cannot properly receive the random access preamble. Thus, there is a need to adjust the times of the transmission of the random access preamble to improve the success rate of the random access procedure.

SUMMARY

In general, embodiments of the present disclosure provide a solution for solving the issue as discussed above.

In a first aspect, a method implemented at a network device is provided. In response to receiving a handover request for handing over a terminal device from a source cell managed by a further network device to a target cell managed by the network device, the network device determines a configuration for a random access preamble transmission. The configuration indicates the number of times of transmission of the random access preamble from the terminal device. Afterwards, the network device transmits the configuration for the random access preamble transmission to the further network device.

In one embodiment, determining the configuration for the random access preamble transmission includes: obtaining a capability of the terminal device from the handover request, the capability indicating whether the terminal device has a reciprocity capability of deriving an uplink transmission beam based on a received downlink transmission beam; and determining the configuration for the random access preamble transmission based on the capability of the terminal device.

In one embodiment, determining the configuration for the random access preamble transmission based on the capability of the terminal device includes: in response to the terminal device having the reciprocity capability, configuring one transmission of the random access preamble; and in response to the terminal device lacking the reciprocity capability, configuring a plurality of transmissions of the random access preamble.

In one embodiment, determining the configuration for the random access preamble transmission includes: determining a radio condition of a link between the terminal device and the network device; and determining the configuration for the random access preamble transmission based on the radio condition.

In one embodiment, determining the radio condition includes: obtaining quality information of the link measured at the terminal device, the quality information including at least one of: a signal strength, a signal power, a signal quality, a signal to noise ratio, and a signal to interference plus noise ratio; and determining the radio condition based on the quality information of the link.

In one embodiment, determining the configuration for the random access preamble transmission based on the radio condition includes: in response to the radio condition exceeding a condition threshold, configuring one transmission of the random access preamble; and in response to the radio condition being less than a condition threshold, configuring a plurality of transmissions of the random access preamble.

In one embodiment, determining the configuration for the random access preamble transmission based on the radio condition includes: in response to the radio condition being less than a first threshold, configuring a first number of transmissions of the random access preamble; in response to the radio condition exceeding the first threshold and being less than a second threshold, configuring a second number of transmissions of the random access preamble; and in response to the radio condition exceeding the second threshold, configuring a third number of transmissions of the random access preamble, wherein the second number is two times of the third number, and the first number is four times of the third number.

In one embodiment, determining the configuration for the random access preamble transmission includes: determining a priority level of at least one of: a capability of the terminal device, a radio condition of a link between the terminal device and the network device, and network throughput; and determining the configuration for the random access preamble transmission based on the priority level.

In one embodiment, transmitting the configuration for the random access preamble transmission to the further network device includes: including the configuration for the random access preamble transmission in a handover request acknowledgement message; and transmitting the handover request acknowledgement message to the further network device.

In a second aspect, an apparatus implemented at a network device is provided. The apparatus includes a determining unit and a transmitting unit. The determining unit is configured to, in response to receiving a handover request for handing over a terminal device from a source cell managed by a further network device to a target cell managed by the network device, determine a configuration for a random access preamble transmission, the configuration indicating the number of times of transmission of the random access preamble from the terminal device. The transmitting unit is configured to transmit the configuration for the random access preamble transmission to the further network device.

In a third aspect, a network device is provided. The network device includes a processor and a memory. The memory contains program including instructions executable by the processor. The processor is configured to cause the network device to perform the method according to the first aspect of the present disclosure.

In a fourth aspect, a method implemented at a terminal device is provided. The terminal device receives a configuration for a random access preamble transmission. The configuration indicates the number of times of transmission of the random access preamble from the terminal device. The configuration is determined in response to a handover request for handing over the terminal device from a source cell to a target cell. Afterwards, the terminal device transmits the random access preamble for the indicated number of times to a network device managing the target cell in a random access procedure to the target cell.

In one embodiment, the configuration for the random access preamble transmission is determined based on at least one of: a capability of the terminal device, the capability indicating whether the terminal device has a reciprocity capability of deriving an uplink transmission beam based on a received downlink transmission beam; a radio condition of a link between the terminal device and the network device; and network throughput.

In one embodiment, if the terminal device has the reciprocity capability, the configuration for the random access preamble transmission indicates one transmission of the random access preamble; and if the terminal device lacks the reciprocity capability, the configuration for the random access preamble transmission indicates a plurality of transmissions of the random access preamble.

In one embodiment, if the radio condition exceeding a condition threshold, the configuration for the random access preamble transmission indicates one transmission of the random access preamble; and if the radio condition being less than a condition threshold, the configuration for the random access preamble transmission indicates a plurality of transmissions of the random access preamble.

In a fifth aspect, an apparatus implemented at a terminal device is provided. The apparatus includes a receiving unit and a transmitting unit. The receiving unit is configured to receive a configuration for a random access preamble transmission. The configuration indicates the number of times of transmission of the random access preamble from the terminal device. The configuration is determined in response to a handover request for handing over the terminal device from a source cell to a target cell. The transmitting unit is configured to transmit the random access preamble for the indicated number of times to a network device managing the target cell in a random access procedure to the target cell.

In a sixth aspect, a terminal device is provided. The terminal device includes: a processor and a memory. The memory contains instructions executable by the processor, whereby the processor being adapted to cause the terminal device to perform the method according to the fourth aspect of the present disclosure.

In a seventh aspect, a computer readable storage medium is provided. The computer readable storage medium has a computer program product embodied thereon. The computer program product includes instructions which, when executed on at least one processor, cause the at least one processor to carry out the method according to the first or the fourth aspect of the present disclosure.

According to embodiments of the present disclosure, a network device configures the number of times of transmission of the random access preamble. A terminal device thus transmits the random access preamble for the configured number of times to the network device in a random access procedure. In this way, performance and reliability of the random access procedure can be improved. As a result, the success rate of the handover can be increased.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE, or other suitable device. The UE may be, for example, a Subscriber Station, a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network device. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
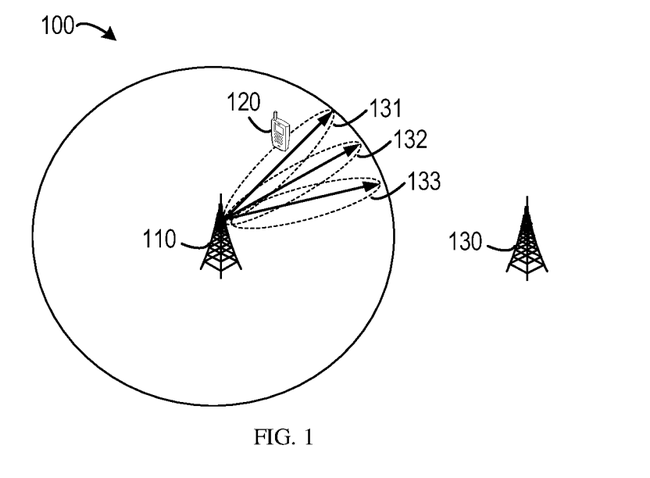
FIG. 1 shows a schematic diagram 100 of a wireless communication network.

Now some exemplary embodiments of the present disclosure will be described below with reference to the figures. Reference is first made to FIG. 1, which shows a schematic diagram 100 of a wireless communication network. During a handover procedure, a connection of a terminal device 120 to the wireless communication network is changed from a source cell to a target cell. In the example shown in FIG. 1, the source cell is managed by a network device (also referred to a "source network device") 130, and the target cell is managed by a network device (also referred to a "target network device") 110.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Conventionally, during the handover procedure, the terminal device only sends the random access preamble once to the target network device. However, if the target network device performs beam sweeping and the beam for receiving the preamble is different from the beam on which the preamble is transmitted, the network device cannot properly receive the random access preamble. In another example, if the terminal device is in a bad radio condition, for instance, the transmit power of the terminal device is not enough to compensate the propagation loss to the network device, the terminal device may rely on the gain using a narrow transmit beam. In such a case, it is also possible that the network device cannot properly receive the random access preamble from the terminal device in a wrong direction. Thus, the random access procedure would be failed and the handover procedure cannot be performed properly.

In order to solve the above and other potential problems, embodiments of the present disclosure provide solutions for configuring the transmission of the random access preamble. In the proposed solution, in response to receiving a handover request for handing over a terminal device from a source cell to a target cell, a network device determines a configuration indicating the number of times of transmission of the random access preamble. The terminal device transmits the random access preamble for the configured number of times to the network device in a random access procedure to the target cell. As such, it is possible to increase the possibility of successful detection of the random access preamble. In this way, performance and reliability of the random access procedure can be improved. As a result, the success rate of the handover can be increased.

More details of embodiments of the present disclosure will be discussed with reference to FIGS. 2 to 9 below. FIG.

Figure 2:
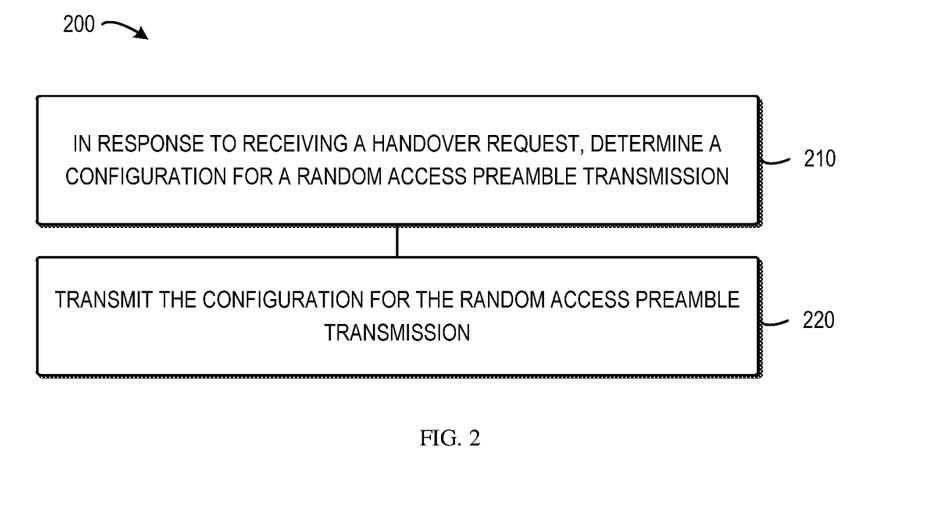
FIG. 2 shows a flowchart of a method 200 of configuring the number of times of preamble transmission in accordance with an embodiment of the present disclosure.

2 shows a flowchart of a method 200 of configuring the number of times of preamble transmission in accordance with an embodiment of the present disclosure. With the method 200, the above and other potential deficiencies in the conventional approaches can be overcome. It would be appreciated by those skilled in the art that the method 200 may be implemented by a network device, such as the target network device 110 or other suitable devices.

The method 200 is entered at block 210, where the network device 110, in response to receiving a handover request for handing over a terminal device 120 from a source cell managed by a further network device 130 to a target cell managed by the network device 110, determines a configuration for a random access preamble transmission. The configuration indicates the number of times of transmission of the random access preamble from the terminal device. According to embodiments of the present disclosure, the configuration for the random access preamble transmission may be determined in a variety of ways. Some examples of the determination of the configuration will be discussed below.

In some cases, if a terminal device, for example, an RRC_connected UE, lacks good reciprocity capability, the RRC_connected UE cannot exactly determine the correct transmit direction to the network device (for example, gNB) based on measurements of the broadcast beams (for example, synchronization signal (SS) block beams, Channel State Indication Reference Signal (CSI-RS) beams) from the gNB. Then the RRC_connected UE needs to try different transmission directions with narrow beams, within which at least one beam can be expected to reach the gNB. The gNB continuously monitors a plurality of PRACH transmissions (i.e., the random access preamble transmission) in the allocated PRACH resources. For an RRC_connected UE with good reciprocity capability, the RRC_connected UE can determine the transmission direction to the gNB based on the measurement of the broadcast beams and transmit single PRACH transmission attempt for random access.

To solve this problem, in some embodiments, the network device 110 obtains a capability of the terminal device 120 from the handover request. The capability indicates whether the terminal device 120 has a reciprocity capability of deriving an uplink transmission beam based on a received downlink transmission beam. Then, the network device 110 may determine the configuration for the random access preamble transmission based on the capability of the terminal device. For instance, if the terminal device 120 has the reciprocity capability, the network device 110 may configure one transmission of the random access preamble. If the terminal device 120 lacks the reciprocity capability, the network device 110 may configure a plurality of transmissions of the random access preamble.

Figure 3:
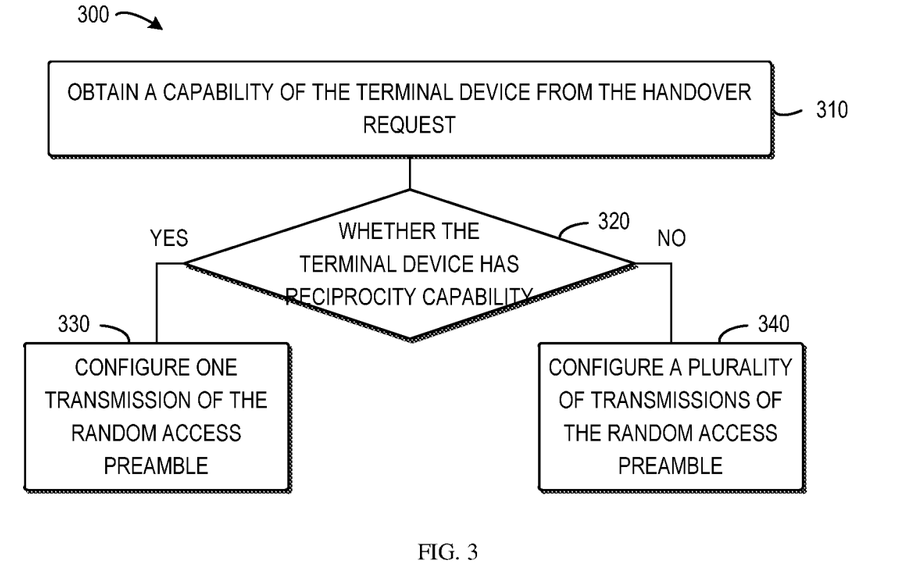
FIG. 3 shows a flowchart of a method 300 of configuring the number of times of preamble transmission in accordance with another embodiment of the present disclosure.

FIG. 3 shows a flowchart of a method 300 of configuring the number of times of preamble transmission based on the reciprocity capability in accordance with another embodiment of the present disclosure. At 310, upon receipt of a HO request from the network device 130, the network device 110 may obtain a capability of the terminal device 120 (also referred to as "UE capability" hereafter) from the HO request. Then the network device 110 may determine, at 320, whether the terminal device 120 has the reciprocity capability, for example, whether the terminal device 120 can derive the correct uplink (UL)transmission beam according to the received downlink (DL) beam. If the terminal device has the reciprocity capability, the network device 110 may configure, at 330, one preamble transmission for the terminal device 120 for random access to the target cell during HO. Otherwise, the network device 110 may configure, at 340, a plurality of preamble transmissions for the terminal device 120 for the random access.

In some embodiments, in the case that the terminal device 120 (for example, a UE) has the reciprocity capability, the UE can derive the incoming direction of the received signals based on the measurement of the downlink beams (e.g. SS bock or CSI-RS beams). Based the incoming direction of received signals, the UE may determine the outgoing direction to the target network device 110 (for example, gNB). Then the UE can derive the precoding matrix to generate TX beam to the determined outgoing direction. At deriving the precoding matrix of TX beam, the differences (e.g. phase and amplitude distortion) between the UE transmitter RF chains and the UE receiver RF chains are compensated. In such a case, even if the UE transmits the random access preamble for only one time, the possibility for the target network device to successfully receive the preamble is high.

In some other cases, the radio condition of the link between the terminal device 120 and the network device 110 may also affect the random access procedure. More specifically, for an RRC_connected UE in good radio condition, the propagation loss to the gNB can be compensated with enough transmit power and the UE can still access the network with a single random access preamble transmission using a wide transmit beam. While for RRC_connected UE in bad radio condition, the transmit power of the UE is not enough to compensate the propagation loss to the gNB, the UE may further rely on the gain using a narrow transmit beam. In such a case, it is possible that the network device cannot properly receive the random access preamble.

To solve this problem, in some embodiments, the network device 110 determines the radio condition of a link between the terminal device and the network device, and determines the configuration for the random access preamble transmission based on the radio condition.

The radio condition of the link may be obtained in several ways. In an embodiment, the network device 110 may obtain quality information of the link measured at the terminal device. The quality information may include signal strength (for example, Received Signal Strength Indication (RSSI)), a signal power (for example, Reference Signal Receiving Power (RSRP)), a signal quality (for example, Reference Signal Receiving Quality (RSRQ)), a signal to noise ratio (SNR), a signal to interference plus noise ratio (SINR), and/or the like. The quality information may be received from the source network device 130 or a suitable control device to which the terminal device 120 may report the quality information. Then, the network device 110 may determine the radio condition based on the quality information of the link. For instance, if the quality information indicates the link has a high quality, then the network device 110 may determine that the radio condition is good. Otherwise, if the quality information indicates the link has a low quality, then the network device 110 may determine that the radio condition is poor.

On the basis of the radio condition of the link, the network device 110 may configure the random access preamble transmission in a variety of ways. In an embodiment, if the radio condition exceeds a condition threshold, for example, if the quality of the link is larger than a predetermined threshold, the network device 110 may configure a single transmission of the random access preamble. If the radio condition is less than the condition threshold, for example, if the quality of the link is less than a predetermined threshold, the network device 110 may configure a plurality of transmissions of the random access preamble.

Figure 4:
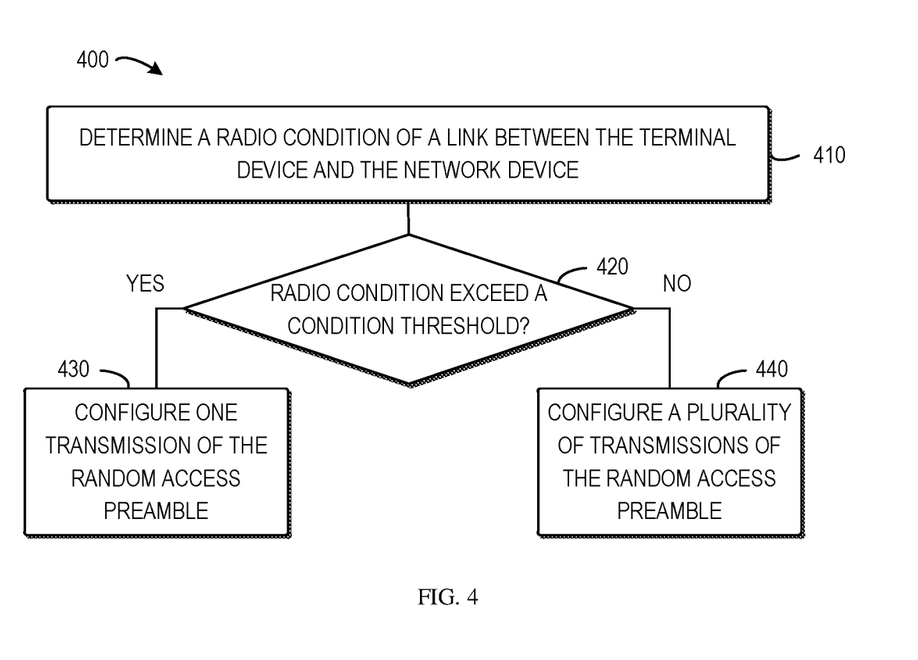
FIG. 4 shows a flowchart of a method 400 of configuring the number of times of preamble transmission in accordance with still another embodiment of the present disclosure.

FIG. 4 shows a flowchart of a method 400 of configuring the number of times of preamble transmission based on the radio condition in accordance with still another embodiment of the present disclosure. At 410, upon receipt of a HO request from the network device 130, the network device 110 may obtain the radio condition, such as a beam quality (for example, RSRP/RSRQ) report from the terminal device 120 via the source network device 130. Then, at 420, the network device 110 may check the radio link quality of the beam between the network device 110 and the terminal device 120 according to the value of RSRP/RSRQ. If the value of RSRP/RSRQ is higher than a predefined threshold, then the network device 110 may configure, at 430, one transmission of the random access preamble. Thus, the terminal device 120 only transmits the random access preamble once when performing random access to the target cell during HO. Otherwise, at 440, the network device 110 may configure a plurality of transmissions of the random access preamble. In this case, the terminal device 120 will transmit the random access preamble for a plurality of times when performing the random access.

In some alternative embodiments, the network device 110 may determine the number of times for transmitting the random access preamble (also referred to as "the number of PRACH transmissions") according to a predefined table. The following Table 1 shows an example of mapping of the radio condition to the number of PRACH transmissions.

TABLE 1

| Index | Radio Condition | The Number of PRACH Transmissions |
|---|---|---|
| 1 | RSRP < X1 | 4N |
| 2 | X1 ≤ RSRP < X2 | 2N |
| 3 | RSRP ≥ X2 | N |

In the example of Table 1, if the radio condition (for example, RSRP) is less than a first threshold, X1, the network device 110 may configure a first number (denoted as K1 for discussion) of transmissions of the random access preamble. If the radio condition exceeds X1 and is less than a second threshold, X2, the network device 110 may configure a second number (denoted as K2 for discussion) of transmissions of the random access preamble. If the radio condition exceeds the second threshold, X2, the network device 110 may configure a third number (denoted as K3 for discussion) of transmissions of the random access preamble. In some embodiments, the second number may be two times of the third number, and the first number is four times of the third number. As shown in the example of Table 1, assuming that the third number equals N (that is, K3=N), then it can be determined that K2=2N and K1=4N, wherein N may be an integer equal to or larger than 1.

It is to be understood that the above example is described for purpose of illustration, rather than limitation. Those skilled in the art would appreciate that K1, K2 and K3 may have other suitable relationships.

Alternatively or in addition, in some embodiments, the network device 110 may determine a priority level of at least one of: a capability of the terminal device (sometimes also referred to as "UE capability"), a radio condition of a link between the terminal device and the network device, the network throughput, and other factors that may be considered in configuring the number of times for transmitting the random access preamble. Then, the network device 110 may determine the configuration for the random access preamble transmission based on the priority level.

For example, upon receipt of the HO request from the source network device 130, the target network device 110 may check both UE capability and radio condition, such as, the beam RSRP. If the terminal device 120 has the reciprocity capability, i.e. it can determine the right UL beam according to the received DL beam, even the beam RSRP is lower than a predetermined threshold, the target network device 110 may still configure the terminal device 120 one transmission of the random access preamble.

Still referring to embodiments described with respect to FIG. 2, at 220, the network device 110 transmits the configuration for the random access preamble transmission to the further network device 130. The configuration for the random access preamble transmission may be transmitted in any suitable form or via any suitable media. In some embodiments, the network device 110 may include the configuration in a handover request acknowledgement message, which may be for example implemented as a handover command, and transmit the handover request acknowledgement message to the network device 130 that manages the source cell.

Additionally, in some embodiments, the configuration for the random access preamble transmission during HO may be applies to L3 mobility scenarios, that is, HO based on SS Block burst set, and/or HO based on CSI-RS.

Compared with the conventional solutions, the network device 110 can configure the number of times of transmission of the random access preamble in an accurate and effective way. The terminal device 120 can transmit the random access preamble for the configured number of times to the network device in a random access procedure. In this way, performance and reliability of the random access procedure can be improved. As a result, the success rate of the handover can be increased.

Figure 5:
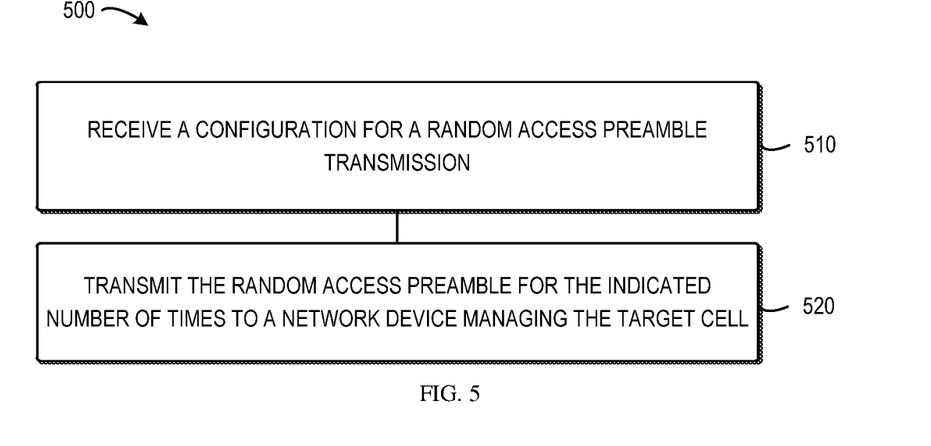
FIG. 5 shows a flowchart of a method 500 of transmitting the random access preamble in accordance with an embodiment of the present disclosure.

FIG. 5 shows a flowchart of a method 500 of transmitting the random access preamble in accordance with an embodiment of the present disclosure. It would be appreciated by those skilled in the art that the method 500 may be implemented by a terminal device, such as the terminal device 120 or other suitable devices.

The method 500 is entered at 510, where the terminal device 120 receives a configuration for a random access preamble transmission. The configuration indicates the number of times of transmission of the random access preamble from the terminal device. The configuration may be determined by the network device 110 in response to a handover request for handing over the terminal device 120 from a source cell managed by the network device 130 to a target cell managed by the network device 110. The determination of the configuration may be implemented in a variety of ways according to embodiments of the present disclosure, for example, the embodiments discussed with respect to FIGS. 2 to 4.

At 520, the terminal device 120 transmits the random access preamble for the indicated number of times to a network device managing the target cell in a random access procedure to the target cell. For example, if the radio condition is good enough and/or the terminal device 120 has the reciprocity capability, the terminal device 120 may be configured to transmit the random access preamble once. In this way, the random access procedure can be successfully performed without introducing unnecessary work load and power consumption. On the other hand, if the radio condition is not so good and/or the terminal device 120 does not have the reciprocity capability, the terminal device 120 may be configured to transmit the random access preamble for a plurality of times. In this way, the possibility for the network device 110 to successfully receive the preamble is increased. As such, reliability of the random access procedure can be improved.

Figure 6:
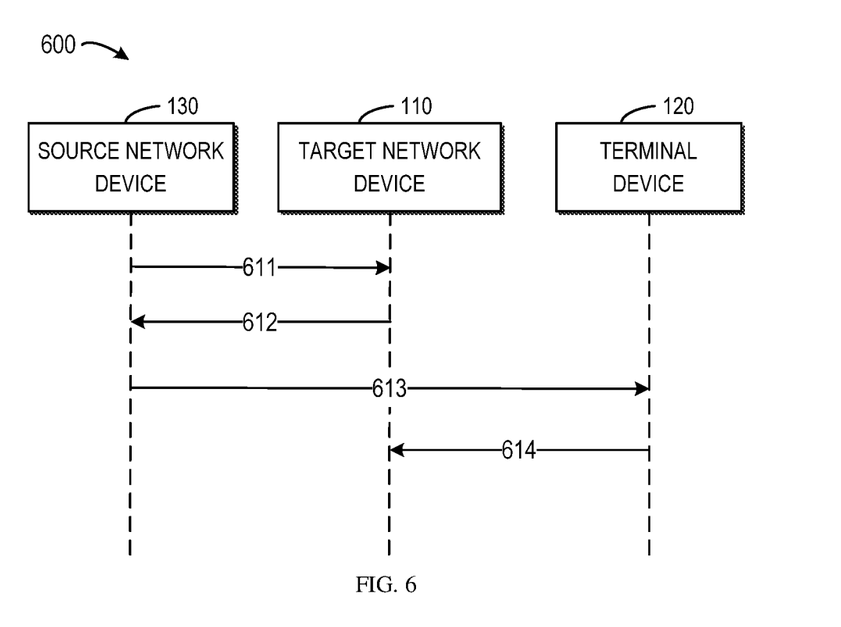
FIG. 6 shows a schematic diagram 600 of a handover procedure in accordance with an embodiment of the present disclosure.

For better understanding, FIG. 6 shows a schematic diagram 600 of a handover procedure in accordance with an embodiment of the present disclosure. In embodiments shown in FIG. 6, the source network device 130 sends 611 a handover request to the target network device 110. In response, the target network device 110 determines a configuration for a random access preamble transmission, for example, according to embodiments discussed with respect to FIGS. 2-4. Then, the target network device 110 transmits 612 the configuration to the source network device 130. The source network device 130 then forwards 613 the configuration to the terminal device 120. Thus, the terminal device 120 transmits 614 the random access preamble for the number of times to a network device indicated by the configuration.

Figure 7:
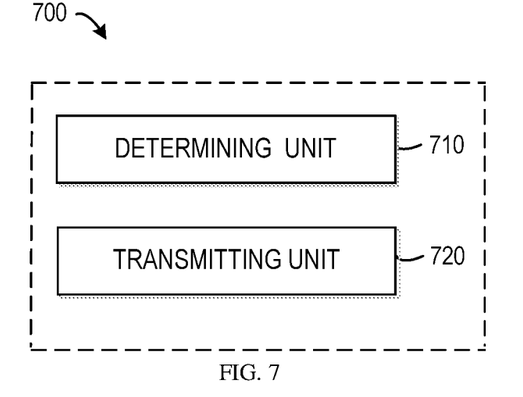
FIG. 7 shows a block diagram of an apparatus 700 implemented at a network device in accordance with an embodiment of the present disclosure.

FIG. 7 shows a block diagram of an apparatus 700 implemented at a network device in accordance with an embodiment of the present disclosure. It would be appreciated that the apparatus 700 may be implemented at a network device, for example, the network device 110 or any other suitable device.

As shown, the apparatus 700 includes a determining unit 710 and a transmitting unit 720. The determining unit 710 is configured to, in response to receiving a handover request for handing over a terminal device from a source cell managed by a further network device to a target cell managed by the network device, determine a configuration for a random access preamble transmission, the configuration indicating the number of times of transmission of the random access preamble from the terminal device. The transmitting unit 720 is configured to transmit the configuration for the random access preamble transmission to the further network device.

In one embodiment, the determining unit 710 may be configured to: obtain a capability of the terminal device from the handover request, the capability indicating whether the terminal device has a reciprocity capability of deriving an uplink transmission beam based on a received downlink transmission beam; and determine the configuration for the random access preamble transmission based on the capability of the terminal device.

In one embodiment, the determining unit 710 may be configured to: in response to the terminal device having the reciprocity capability, configure one transmission of the random access preamble; and in response to the terminal device lacking the reciprocity capability, configure a plurality of transmissions of the random access preamble.

In one embodiment, the determining unit 710 may be configured to: determine a radio condition of a link between the terminal device and the network device; and determine the configuration for the random access preamble transmission based on the radio condition.

In one embodiment, the determining unit 710 may be configured to: obtain quality information of the link measured at the terminal device, the quality information including at least one of: a signal strength, a signal power, a signal quality, a signal to noise ratio, and a signal to interference plus noise ratio; and determine the radio condition based on the quality information of the link.

In one embodiment, the determining unit 710 may be configured to: in response to the radio condition exceeding a condition threshold, configure one transmission of the random access preamble; and in response to the radio condition being less than a condition threshold, configure a plurality of transmissions of the random access preamble.

In one embodiment, the determining unit 710 may be configured to: in response to the radio condition being less than a first threshold, configure a first number of transmissions of the random access preamble; in response to the radio condition exceeding the first threshold and being less than a second threshold, configure a second number of transmissions of the random access preamble; and in response to the radio condition exceeding the second threshold, configure a third number of transmissions of the random access preamble, wherein the second number is two times of the third number, and the first number is four times of the third number.

In one embodiment, the determining unit 710 may be configured to: determine a priority level of at least one of: a capability of the terminal device, a radio condition of a link between the terminal device and the network device, and network throughput; and determine the configuration for the random access preamble transmission based on the priority level.

In one embodiment, the transmitting unit 720 may be configured to: include the configuration for the random access preamble transmission in a handover request acknowledgement message; and transmit the handover request acknowledgement message to the further network device.

Figure 8:
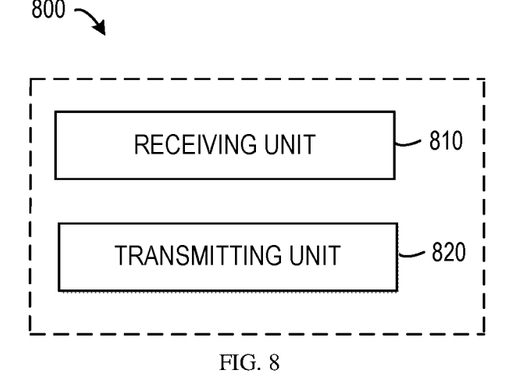
FIG. 8 shows a block diagram of an apparatus 800 implemented at a terminal device in accordance with an embodiment of the present disclosure.

FIG. 8 shows a block diagram of an apparatus 800 implemented at a terminal device in accordance with an embodiment of the present disclosure. It would be appreciated that the apparatus 800 may be implemented at a terminal device, for example, the terminal device 120 or any other suitable device.

As shown, the apparatus 800 includes a receiving unit 810 and a transmitting unit 820. The receiving unit 810 is configured to receive a configuration for a random access preamble transmission. The configuration indicates the number of times of transmission of the random access preamble from the terminal device. The configuration is determined in response to a handover request for handing over the terminal device from a source cell to a target cell. The transmitting unit 820 is configured to transmit the random access preamble for the indicated number of times to a network device managing the target cell in a random access procedure to the target cell.

In an embodiment, the configuration for the random access preamble transmission is determined based on at least one of: a capability of the terminal device, the capability indicating whether the terminal device has a reciprocity capability of deriving an uplink transmission beam based on a received downlink transmission beam; a radio condition of a link between the terminal device and the network device; and network throughput.

In one embodiment, if the terminal device has the reciprocity capability, the configuration for the random access preamble transmission indicates one transmission of the random access preamble; and if the terminal device lacks the reciprocity capability, the configuration for the random access preamble transmission indicates a plurality of transmissions of the random access preamble.

In one embodiment, if the radio condition exceeding a condition threshold, the configuration for the random access preamble transmission indicates one transmission of the random access preamble; and if the radio condition being less than a condition threshold, the configuration for the random access preamble transmission indicates a plurality of transmissions of the random access preamble.

It should be appreciated that components included in the apparatuses 700 and 800 correspond to the operations of the methods 200 to 500, respectively. Therefore, all operations and features described above with reference to FIGS. 2-5 are likewise applicable to the components included in the apparatuses 700 and 800 and have similar effects, respectively. For the purpose of simplification, the details will be omitted.

The components included in the apparatus 700 or 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatus 700 or 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a network device. The apparatus includes: means for, in response to receiving a handover request for handing over a terminal device from a source cell managed by a further network device to a target cell managed by the network device, determining a configuration for a random access preamble transmission, the configuration indicating the number of times of transmission of the random access preamble from the terminal device; and means for transmitting the configuration for the random access preamble transmission to the further network device.

In an embodiment, the means for determining the configuration for the random access preamble transmission includes: means for obtaining a capability of the terminal device from the handover request, the capability indicating whether the terminal device has a reciprocity capability of deriving an uplink transmission beam based on a received downlink transmission beam; and means for determining the configuration for the random access preamble transmission based on the capability of the terminal device.

In an embodiment, the means for determining the configuration for the random access preamble transmission based on the capability of the terminal device includes: means for, in response to the terminal device having the reciprocity capability, configuring one transmission of the random access preamble; and means for, in response to the terminal device lacking the reciprocity capability, configuring a plurality of transmissions of the random access preamble.

In an embodiment, the means for determining the configuration for the random access preamble transmission includes: means for determining a radio condition of a link between the terminal device and the network device; and means for determining the configuration for the random access preamble transmission based on the radio condition.

In an embodiment, the means for determining the radio condition includes: means for obtaining quality information of the link measured at the terminal device, the quality information including at least one of: a signal strength, a signal power, a signal quality, a signal to noise ratio, and a signal to interference plus noise ratio; and means for determining the radio condition based on the quality information of the link.

In an embodiment, the means for determining the configuration for the random access preamble transmission based on the radio condition includes: means for in response to the radio condition exceeding a condition threshold, configuring one transmission of the random access preamble; and means for in response to the radio condition being less than a condition threshold, configuring a plurality of transmissions of the random access preamble.

In an embodiment, the means for determining the configuration for the random access preamble transmission based on the radio condition includes: means for in response to the radio condition being less than a first threshold, configuring a first number of transmissions of the random access preamble; means for in response to the radio condition exceeding the first threshold and being less than a second threshold, configuring a second number of transmissions of the random access preamble; and means for in response to the radio condition exceeding the second threshold, configuring a third number of transmissions of the random access preamble, wherein the second number is two times of the third number, and the first number is four times of the third number.

In an embodiment, the means for determining the configuration for the random access preamble transmission includes: means for determining a priority level of at least one of: a capability of the terminal device, a radio condition of a link between the terminal device and the network device, and network throughput; and means for determining the configuration for the random access preamble transmission based on the priority level.

In an embodiment, the means for transmitting the configuration for the random access preamble transmission to the further network device includes: means for including the configuration for the random access preamble transmission in a handover request acknowledgement message; and means for transmitting the handover request acknowledgement message to the further network device.

In accordance with embodiments of the present disclosure, there is provided an apparatus implemented at a terminal device. The apparatus includes: means for receiving a configuration for a random access preamble transmission, the configuration indicating the number of times of transmission of the random access preamble from the terminal device, and the configuration being determined in response to a handover request for handing over the terminal device from a source cell to a target cell; and means for transmitting the random access preamble for the indicated number of times to a network device managing the target cell in a random access procedure to the target cell.

In an embodiment, the configuration for the random access preamble transmission is determined based on at least one of: a capability of the terminal device, the capability indicating whether the terminal device has a reciprocity capability of deriving an uplink transmission beam based on a received downlink transmission beam; a radio condition of a link between the terminal device and the network device; and network throughput.

In an embodiment, if the terminal device has the reciprocity capability, the configuration for the random access preamble transmission indicates one transmission of the random access preamble; and if the terminal device lacks the reciprocity capability, the configuration for the random access preamble transmission indicates a plurality of transmissions of the random access preamble.

In an embodiment, if the radio condition exceeding a condition threshold, the configuration for the random access preamble transmission indicates one transmission of the random access preamble; and if the radio condition being less than a condition threshold, the configuration for the random access preamble transmission indicates a plurality of transmissions of the random access preamble.

Figure 9:
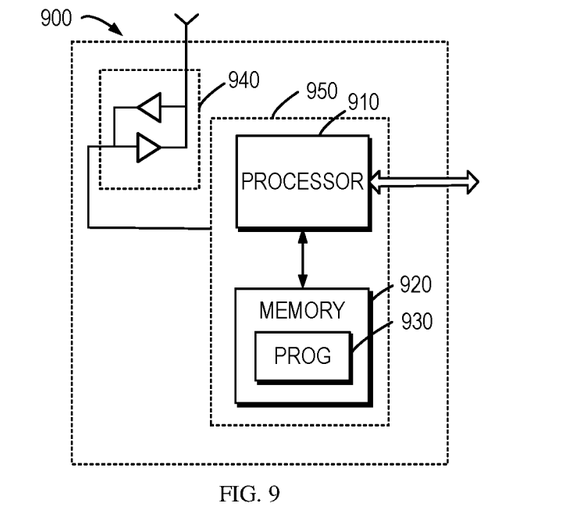
FIG. 9 shows a simplified block diagram 900 of a device that is suitable for use in implementing embodiments of the present disclosure.

FIG. 9 is a simplified block diagram of a device 900 that is suitable for implementing embodiments of the present disclosure. As shown, the device 900 includes one or more processors 910, one or more memories 920 coupled to the processor(s) 910, one or more transmitters and/or receivers (TX/RX) 940 coupled to the processor 910.

The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 920 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements.

The program 930 is assumed to include program instructions that, when executed by the associated processor 910, enable the device 900 to operate in accordance with the embodiments of the present disclosure, as discussed herein with reference to FIGS. 2 to 5. That is, embodiments of the present disclosure can be implemented by computer software executable by the processor 910 of the device 900, or by hardware, or by a combination of software and hardware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method at a network device, comprising:
in response to receiving a handover request for handing over a terminal device from a source cell managed by a further network device to a target cell managed by the network device, determining a configuration for a random access preamble transmission, the configuration indicating the number of times of transmission of the random access preamble from the terminal device; and
transmitting the configuration for the random access preamble transmission to the further network device.

2. The method of claim 1, wherein determining the configuration for the random access preamble transmission comprises:
obtaining a capability of the terminal device from the handover request, the capability indicating whether the terminal device has a reciprocity capability of deriving an uplink transmission beam based on a received downlink transmission beam; and
determining the configuration for the random access preamble transmission based on the capability of the terminal device.

3. The method of claim 2, wherein determining the configuration for the random access preamble transmission based on the capability of the terminal device comprises:
in response to the terminal device having the reciprocity capability, configuring one transmission of the random access preamble; and
in response to the terminal device lacking the reciprocity capability, configuring a plurality of transmissions of the random access preamble.

4. The method of claim 1, wherein determining the configuration for the random access preamble transmission comprises:
determining a radio condition of a link between the terminal device and the network device; and
determining the configuration for the random access preamble transmission based on the radio condition.

5. The method of claim 4, wherein determining the radio condition comprises:
obtaining quality information of the link measured at the terminal device, the quality information including at least one of: a signal strength, a signal power, a signal quality, a signal to noise ratio, and a signal to interference plus noise ratio; and
determining the radio condition based on the quality information of the link.

6. The method of claim 4, wherein determining the configuration for the random access preamble transmission based on the radio condition comprises:
in response to the radio condition exceeding a condition threshold, configuring one transmission of the random access preamble; and
in response to the radio condition being less than a condition threshold, configuring a plurality of transmissions of the random access preamble.

7. The method of claim 4, wherein determining the configuration for the random access preamble transmission based on the radio condition comprises:
in response to the radio condition being less than a first threshold, configuring a first number of transmissions of the random access preamble;
in response to the radio condition exceeding the first threshold and being less than a second threshold, configuring a second number of transmissions of the random access preamble; and
in response to the radio condition exceeding the second threshold, configuring a third number of transmissions of the random access preamble,
wherein the second number is two times of the third number, and the first number is four times of the third number.

8. The method of claim 1, wherein determining the configuration for the random access preamble transmission comprises:
determining a priority level of at least one of: a capability of the terminal device, a radio condition of a link between the terminal device and the network device, and network throughput; and
determining the configuration for the random access preamble transmission based on the priority level.

9. The method of claim 1, wherein transmitting the configuration for the random access preamble transmission to the further network device comprises:
including the configuration for the random access preamble transmission in a handover request acknowledgement message; and
transmitting the handover request acknowledgement message to the further network device.

10. A network device, comprising:
a processor; and
a memory, the memory containing program including instructions executable by the processor, the processor being configured to cause the network device to:
in response to receiving a handover request for handing over a terminal device from a source cell managed by a further network device to a target cell managed by the network device, determine a configuration for a random access preamble transmission, the configuration indicating the number of times of transmission of the random access preamble from the terminal device; and
transmit the configuration for the random access preamble transmission to the further network device.

11. The device of claim 10, wherein the processor being further configured to cause the network device to:
obtain a capability of the terminal device from the handover request, the capability indicating whether the terminal device has a reciprocity capability of deriving an uplink transmission beam based on a received downlink transmission beam; and
determine the configuration for the random access preamble transmission based on the capability of the terminal device.

12. The device of claim 11, wherein the processor being further configured to cause the network device to:
in response to the terminal device having the reciprocity capability, configure one transmission of the random access preamble; and
in response to the terminal device lacking the reciprocity capability, configure a plurality of transmissions of the random access preamble.

13. The device of claim 10, wherein the processor being further configured to cause the network device to:
determine a radio condition of a link between the terminal device and the network device; and
determine the configuration for the random access preamble transmission based on the radio condition.

14. The device of claim 13, wherein the processor being further configured to cause the network device to:

obtain quality information of the link measured at the terminal device, the quality information including at least one of: a signal strength, a signal power, a signal quality, a signal to noise ratio, and a signal to interference plus noise ratio; and determine the radio condition based on the quality information of the link.

15. The device of claim 10, wherein the processor being further configured to cause the network device to:

determine a priority level of at least one of: a capability of the terminal device, a radio condition of a link between the terminal device and the network device, and network throughput; and determine the configuration for the random access preamble transmission based on the priority level.

16. A terminal device, comprising:

a processor; and a memory, the memory containing program including instructions executable by the processor, the processor being configured to cause the terminal device to:

receive a configuration for a random access preamble transmission, the configuration indicating the number of times of transmission of the random access preamble from the terminal device, and the configuration being determined in response to a handover request for handing over the terminal device from a source cell to a target cell; and transmit the random access preamble for the indicated number of times to a network device managing the target cell in a random access procedure to the target cell.

17. The device of claim 16, wherein the configuration for the random access preamble transmission is determined based on at least one of:

a capability of the terminal device, the capability indicating whether the terminal device has a reciprocity capability of deriving an uplink transmission beam based on a received downlink transmission beam;

a radio condition of a link between the terminal device and the network device; and network throughput.

18. The device of claim 17, wherein if the terminal device has the reciprocity capability, the configuration for the random access preamble transmission indicates one transmission of the random access preamble; and if the terminal device lacks the reciprocity capability, the configuration for the random access preamble transmission indicates a plurality of transmissions of the random access preamble.

19. The device of claim 17, wherein if the radio condition exceeding a condition threshold, the configuration for the random access preamble transmission indicates one transmission of the random access preamble; and if the radio condition being less than a condition threshold, the configuration for the random access preamble transmission indicates a plurality of transmissions of the random access preamble.

* * * * *